Nov. 11, 1941.　　　W. SCHNEIDER　　　2,262,052
PISTON RING
Filed Dec. 16, 1938
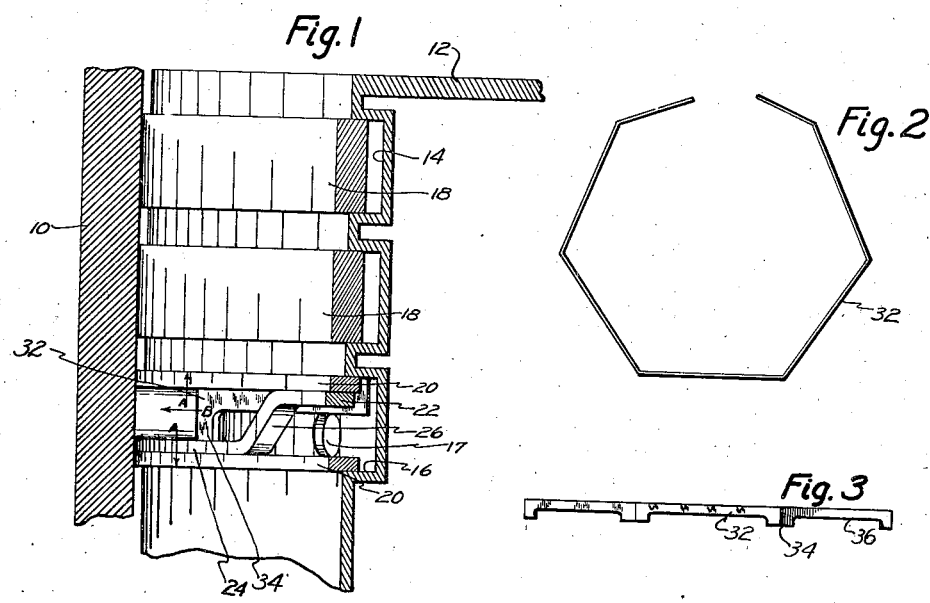
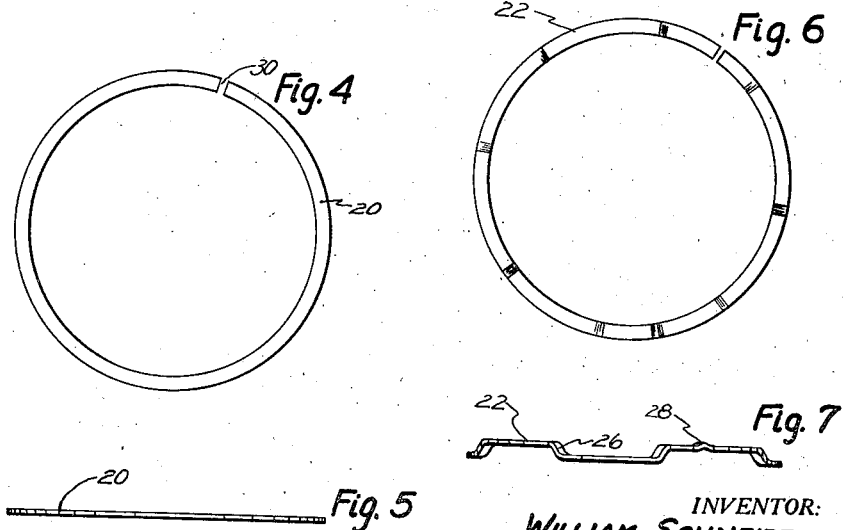
INVENTOR:
WILLIAM SCHNEIDER
BY
Roy M. Eilers
ATTORNEYS.

Patented Nov. 11, 1941

2,262,052

UNITED STATES PATENT OFFICE 2,262,052

PISTON RING

William Schneider, Wellston, Mo.

Application December 16, 1938, Serial No. 246,151

1 Claim. (Cl. 309—45)

This invention relates to piston oil rings of a type characterized by a triple-part main unit of assembly and a companion unit in the form of an expander.

It is an object of this invention to provide an improved oil ring of the above type which will reduce oil consumption in internal combustion engines and yet allow proper lubrication of the cylinder walls and the piston rings.

It is another object of this invention to provide a piston oil ring whose various parts are coordinated and assembled to compensate for and automatically take up wear while at the same time maintaining uniform pressure and wear on the complemental ring parts.

I have found that a very satisfactory oil ring can be formed by assembling in proper relation two superposed rings and an intervening resilient spacer all made from ribbon steel. Various types of piston rings made from ribbon steel have been known in the art but I have found that when ribbon steel is used, in place of the cast iron usually employed, various factors of design enter and must all be properly coordinated to produce a satisfactory ring. If this is not done, the results obtained with steel ribbon rings may be much less satisfactory than those obtained with cast rings.

Further objects and advantages will appear more fully from the following detailed description and the accompanying drawing.

I will now describe one form of the present invention as illustrated by the accompanying drawing.

Fig. 1 is a fragmentary perspective view of a portion of a piston fitted with compression and oil rings in a cylinder.

Fig. 2 is a top plan view of the expander.

Fig. 3 is a side view of the expander.

Fig. 4 is a plan view of one of the outer rings of the oil ring assembly.

Fig. 5 is a side view of the ring shown in Fig. 4.

Fig. 6 is a plan view of the resilient spacer of the oil ring assembly.

Fig. 7 is a side view of a portion of the resilient spacer of the oil ring assembly.

In the drawing 10 is a portion of a cylinder wall of an internal combustion engine. 12 is a section of a piston provided with ring grooves 14. The ring grooves have side walls 16.

For purposes of illustration, I show compression rings 18 in the upper ring grooves, although these rings form no part of my invention.

In the lower ring groove, I show my oil ring assembly. It is obvious that this assembly may be placed in whatever groove the oil ring is usually placed. Thus while it is shown above the wrist pin, it is obvious that it could be placed in a groove below the wrist pin or in any other suitable ring groove on the piston. The piston may be provided with oil drain holes 17 in the oil ring groove.

The main unit of the oil ring assembly includes a pair of superposed parallel flat faced thin split rings 20, separated by a resilient spacer 22. The resilient spacer is provided with alternate elongate offset portions 24. These offset or crown portions are flat and parallel to the rings 20 and are maintained against the rings 20 by the resiliency of a connecting portion or web 26. Both the resilient spacer and the superposed rings are formed from a resilient steel similar to that used in clock springs. Thus for a cylinder diameter of $3\frac{1}{16}$ inches, I have found metal .024 inch thick and approximately $\frac{5}{32}$ inch wide to operate satisfactorily. These parts of the oil ring assembly may be stamped or formed from ribbons of this metal by suitable dies. The resilient spacer 22 is provided with humps 28 on its opposite faces. These humps cooperate with the space 30 formed by the split in rings 20 to maintain the superposed rings and spacer in proper circumferential relation. The split portions of the superposed rings and the resilient spacer are thus prevented from coming into alignment.

A companion unit is provided for the main unit in the form of a resilient expander 32 of polygonal shape and formed from material similar to that used in the other parts of the oil ring. The expander is positioned behind the main triple-part unit assembly of the superposed rings and the resilient spacer. The expander may be provided with circumferentially spaced projections or feet 34 which form oil circulating apertures 36. It is, of course, obvious that various types of expanders may be used, it being only necessary that they conform to certain requirements which will later be set forth.

It can be seen from the drawing (Fig. 1) that the resilient spacer will cause the superposed rings to exert a force against the side walls 16 of the ring groove. This force may be denoted by the letter A and is in a direction shown by the arrows. It will also be seen that the expander will exert a force on the superposed rings and the resilient spacer outwardly. This force may be denoted by the letter B and is in a direction shown by the arrow. Because of the force A exerted against the side walls of the ring groove, all of the force B will not be communicated to the cylinder walls 10. The force on the cylinder walls will be the difference between the expander force B and the force necessary to overcome the friction of the superposed rings against the side walls of the ring groove. This frictional force, which acts against the force B, may be represented by $\mu A$ where $\mu$ is the coefficient of friction between the superposed rings and the side walls of the ring grooves and A is the force exerted by both superposed rings against the walls 16. The force exerted on the piston walls by the two superposed rings and the resilient spacer will then be $B-\mu A$. In early experiments on rings of this type, very little attention was paid to the above facts. It was thought that the greater the force against the cylinder walls, the better was the oil ring. I have found, however, that such is not the case. By various experiments, I have found that on a $3\frac{1}{16}$ inch diameter cylinder, the total pressure of the main unit oil ring assembly against the side walls of the ring grooves should be approximately four pounds and eleven ounces. Variations in too large a degree from this pressure produce very unsatisfactory results. It can be seen that to obtain such a resulting pressure against the cylinder walls, various factors must be considered. It is necessary to carefully co-ordinate the spring of the expander against the spring of the spacer to achieve the proper resulting pressure against the cylinder walls. The dimensions and spring of these two parts must also be varied both with the depth and the width of the oil ring groove. Thus if the ring groove is wider, either less expander pressure or more spacer pressure is necessary, while if the groove is deeper and the same expander is used, less spacer pressure is necessary. A shallower groove with the same expander requires more spacer pressure.

I have found a resilient spacer provided with elongate flat crown portions or segments preferable since these flat portions maintain the superposed rings in alignment and will not deform the superposed rings as will other forms of spacers. With a cylinder diameter of $3\frac{1}{16}$ inches and with the web portions of the spacer at substantially the angle shown, I have found that four crown portions adjacent each superposed ring produce a satisfactory result. I have made the same spacer with eight crown portions adjacent each superposed ring, but the results met with failure. It can be seen, therefore, that there is a close relationship between the various parts of the main unit assembly. While the dimensions and pressure given are for a cylinder diameter of $3\frac{1}{16}$ inches, the proper pressures and dimensions for other cylinder sizes will be proportionate to those given.

It can be seen that large spaces are provided between the superposed rings and the spacer through which oil may circulate. This allows free circulation of oil and keeps the ring cool which materially aids in preventing formation of carbon on the ring with consequent heavy oil consumption caused by clogged drain holes in the piston and ring.

Many other oil rings produce a heavy pressure against the cylinder walls and wipe them clean of oil. This, however, prevents lubrication of the cylinder walls and produces heavy wear on the rings and cylinder walls. Using the particular pressures above set forth, I have found by test that my ring allows proper lubrication of the cylinder walls and at the same time prevents excessive oil consumption. In various tests on racing cars, I have found my oil rings to last three or four times as long as ordinary oil rings and at the same time, lengthen the useful life of the compression rings.

The pressures against the cylinder wall are, however, quite critical. This can well be illustrated by one test which I made in which motor performance was satisfactory when the drag on one piston due to my oil ring pressure was between two pounds, eight ounces and three pounds, and motor performance unsatisfactory when the drag was either above or below this amount even two ounces. This criticalness, however, is not such a disadvantage as might be seemed for the parts of the ring are so very simple that it is only necessary to vary the dimensions of one to care for the various oversizes of pistons and piston grooves.

From the foregoing disclosure it will be seen that for a cylinder diameter of $3\frac{1}{16}''$ or $4\frac{8}{16}''$, the axial pressure against the side walls of the groove is approximately 4 lbs. 11 oz. or approximately 75 oz. and that the radial pressure against the cylinder wall is approximately from 2 lbs. 8 oz. to 3 lbs. or from 40 to 48 oz. The co-ordinated relationship between these factors may therefore be readily expressed within the range of the approximate ratios of from 75:40:49 to 75:48:49, wherein 75 represents the axial pressure, 40 and 48 represent the radial pressure in ounces and wherein 49 represents the cylinder diameter in 16ths of an inch.

It is to be understood that various changes may be made in the construction and in the combination of the several parts without departing from the scope of the invention, provided such changes fall within the appended claim.

I claim:

In combination with a grooved piston within a cylinder, a ribbon steel oil ring assembly comprising upper and lower resilient rings, a spacer between the rings having an alternately disposed upper series and lower series of flat crown portions interconnected by resilient web portions adapted to axially urge the rings into frictional contact with the upper and lower walls of the piston groove, and a ribbon steel expander adapted to radially expand the rings and spacer against the cylinder wall; the rings and spacer being of uniform gauge spring ribbon steel formed and arranged with said expander so that the radial pressure on the wall of the cylinder is coordinated with the axial pressure on the walls of the groove and with the cylinder diameter, said radial pressure when measured in ounces being proportional to said axial pressure when measured in ounces and to said diameter when measured in sixteenths of an inch, within the range of the approximate ratios of from 75:40:49 to 75:48:49.

WILLIAM SCHNEIDER.